July 25, 1933.  H. WALTERS  1,919,492
WHEEL HUB CAP AND LOCK THEREFOR
Filed Oct. 10, 1932   2 Sheets-Sheet 1

INVENTOR
Herbert Walters,
BY
ATTORNEYS

July 25, 1933.  H. WALTERS  1,919,492
WHEEL HUB CAP AND LOCK THEREFOR
Filed Oct. 10, 1932  2 Sheets-Sheet 2
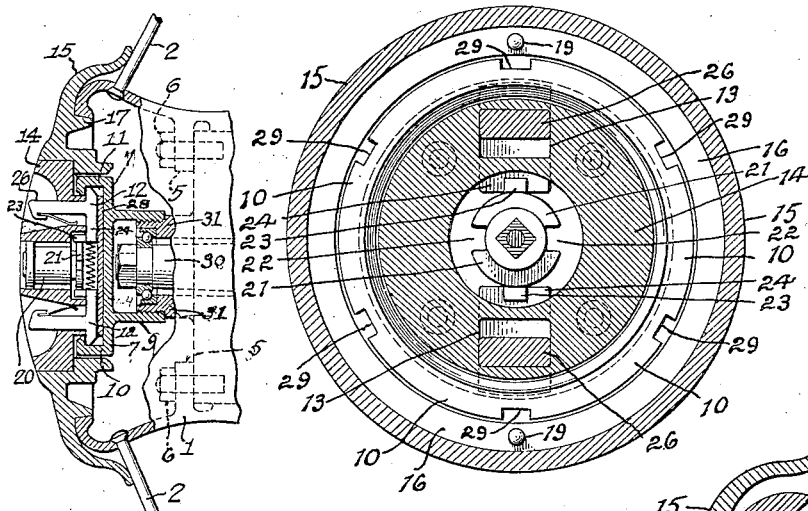
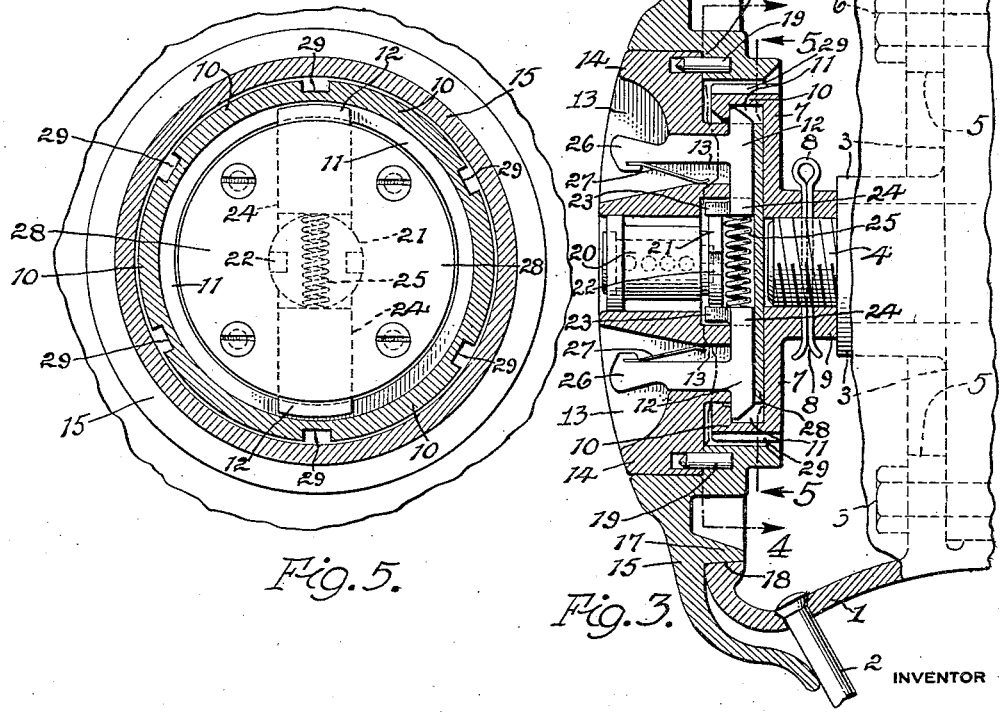
INVENTOR
Herbert Walters,
BY
ATTORNEYS Patented July 25, 1933

1,919,492

UNITED STATES PATENT OFFICE

HERBERT WALTERS, OF DETROIT, MICHIGAN, ASSIGNOR, BY DIRECT AND MESNE ASSIGNMENTS, TO DETROIT METAL SPECIALTY CORPORATION, OF DETROIT, MICHIGAN, A CORPORATION OF MICHIGAN

WHEEL HUB CAP AND LOCK THEREFOR

Application filed October 10, 1932. Serial No. 636,983.

This invention relates to quick detachable key controlled means for locking demountable wheels in operative position upon the ends of their axles or other support, and an object of the invention is to provide a simple construction of wheel hub cap with a key operated lock to prevent the unauthorized removal of said cap and which cap is arranged to conceal means within the end of the hub, for securing the wheel upon the end of the axle or other support therefor, so that the wheel cannot be removed from such support without the use of the proper key. A further object is to provide hand operated means carried by such cap and quickly and conveniently operable from the exterior of the cap, for detachably holding said cap firmly in place over the outer open end of the wheel hub, such locking means being in turn locked by a key controlled lock, and to provide a simple construction readily applicable to wheels as commonly constructed for mounting upon fixed axles to turn freely thereon independently thereof or to turn with a driving shaft within the axle.

The invention further consists in providing certain other new and useful features, all as hereinafter set forth and more particularly pointed out in the appended claims, reference being had to the accompanying drawings wherein;

Fig. 3 is a section longitudinally of the wheel hub, substantially upon the line 3—3 of Fig. 1;
Fig. 4 is a transverse section substantially upon the line 4—4 of Fig. 3;

Fig. 5 is a section similar to that of Fig. 4 but looking in an opposite direction, substantially upon the line 5—5 of Fig. 3; and Fig. 6 is a sectional view similar to that of Fig. 3 but illustrating the application of the invention to a front wheel of a vehicle.

Figure 1:
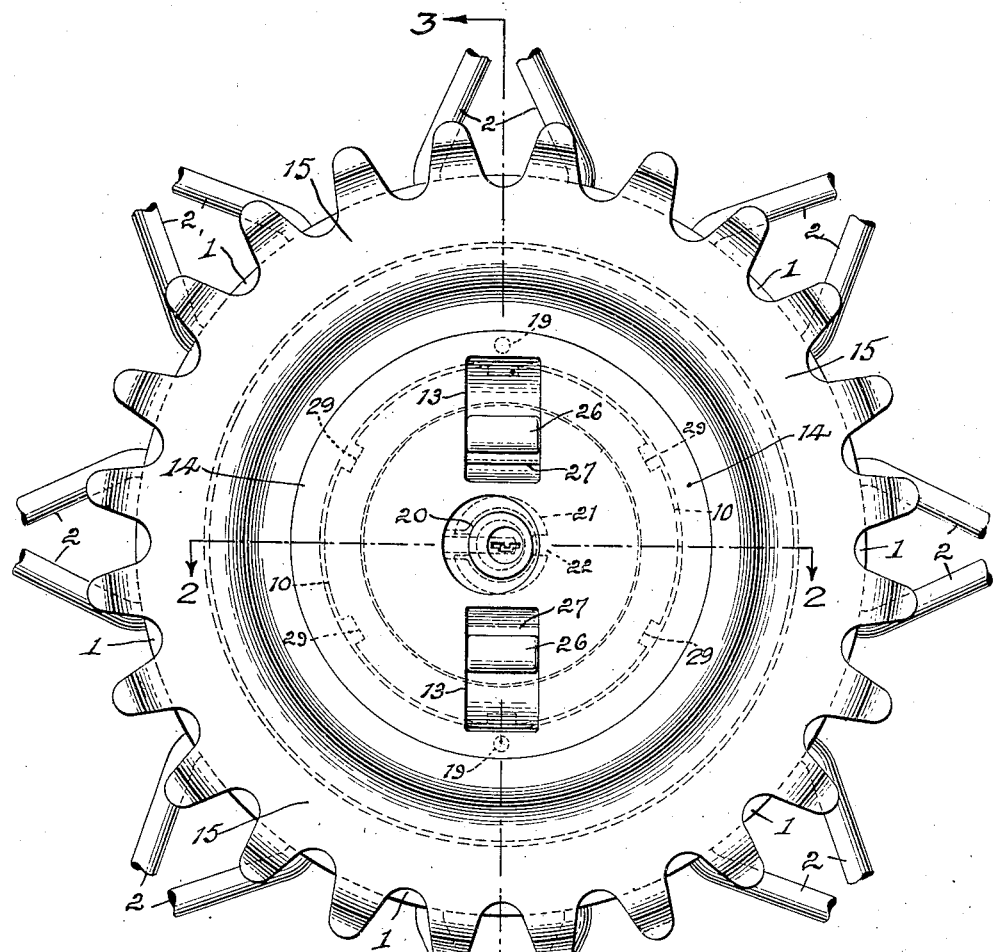
Figure 1 is a front end elevation of a wheel hub showing the present invention as applied thereto;
Figure 2:
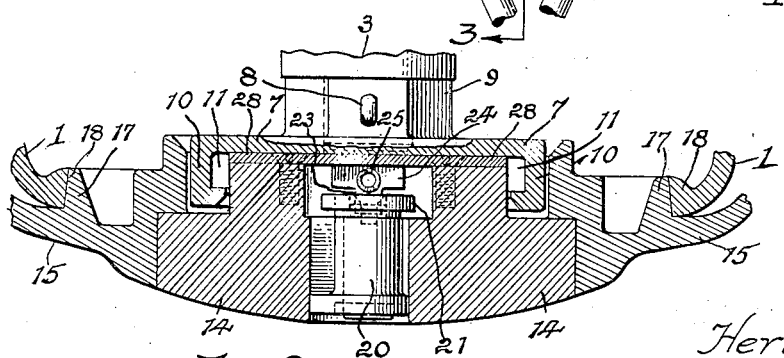
Fig. 2 is a transverse section substantially upon the line 2—2 of Fig. 1.

As shown, 1 indicates a wheel hub shell of the usual construction, to which hub shell the wire spokes 2 are attached in the usual manner, but it will be understood that the showing of a wire wheel is merely illustrative and that the present invention may be applied to other types of wheels as well.

In Fig. 3, the hub shell 1 is shown as detachably secured upon an inner rotatable hub 3 which in turn, rotates about an axle shaft 4, all arranged in the usual manner, said shell being provided with inwardly projecting ears 5 to engage fixed studs or bolts on the inner hub, said shell being firmly and detachably secured upon said studs by nuts 6. In said Fig. 3, the projecting end of the shaft 4 is shown screwthreaded and a disk 7 is screwed thereon and firmly secured thereto to turn therewith, by means of a cotter or other pin 8 passing through an opening in the shaft and also through openings in the hub 9 of said disk. This arrangement as shown in Fig. 3, is in connection with a rear axle construction where all the mentioned parts turn together, but when applied to a front axle where the inner hub 3 and wheel are mounted to turn freely about a fixed and pivoted stud or spindle 30 in the usual manner, as shown in Fig. 6, the disk 7 instead of being secured to the shaft 4, will be secured to the hub 31 by enlarging the diameter of the hub 9 of the disk 7 and internally screwthreading the same to screw upon the end of the hub 31. The disk 7 will therefore turn with the hub 31 freely about the fixed pivoted spindle 30.

In the case of a spare wheel, the support for such a wheel, will be a fixed stub shaft or similar support on the car frame and to which stub the disk 7 will be detachably secured in any suitable manner, this securing means being concealed by the application of the cap hereinafter described, to the wheel hub shell and which cap is locked in place by a key operated lock.

The disk 7 is formed with a laterally projecting peripheral flange 10 having an inwardly projecting edge rib which forms an annular groove 11 between it and the disk, to receive the ends of a pair of dogs 12 which are mounted for sliding movement toward and from the axis of said disk, within radial ways 13 in an axial cap member indicated as a whole by the numeral 14. This axial cap member 14 is adapted to fit within an axial opening in the main or outer annular cap member which is indicated as a whole by the numeral 15, said member 14 abutting an annular inwardly projecting shoulder 16 on said outer member 13, which outer member is shaped to cover and close the outer end of the hub shell 1, said member 15 being formed with an annular laterally projecting rib 17, the outer side of which is tapered so that said rib will fit closely within the inturned annular edge 18 of the hub shell end.

To prevent the axial cap member 14 from turning relative to the cap member 15, pins 19 are set in the shoulder 16 of the member 15 to engage openings in the inner side of the member 14 near its periphery, and this axial cap member 14 is formed with an axial opening therethrough into which a lock barrel 20 of any old and well known construction is fixedly secured in any suitable manner. Mounted upon the inner end of the key operated inner barrel of this lock, is a disk forming an annular flange 21 which is provided with the diametrically opposed notches 22 to receive lugs 23 projecting laterally from the inner ends of the radially and inwardly extending arms 24 of the dogs 12. Within the inner end of the axial recess of cap member 14, is a coiled spring 25 between the opposed ends of the arms 24 and exerting a force to normally hold these dogs moved radially outward to hold their outer ends engaged within the annular groove 11 of the disk 7 which is secured to the shaft 4 where the device is applied to the wheel of the rear axle, or where applied to a front wheel, said disk is secured to the outer end of the hub 31. Therefore said axial cap member 14 is detachably held in place over the outer side of this disk 7, by these dogs 12 and this axial cap member in turn securely holds the annular cap member 15 in place over and completely closing the outer end of the wheel hub shell 1, so that before the pin 8 can be removed to allow the disk 7 to be unscrewed and taken off to give access to a nut on the end of the stub 30 so that the inner hub with its wheel may be removed, or before the nuts 6 can be taken off to release the wheel from said inner hub, these dogs 12 must be moved inward to disengage them from the groove 11.

To prevent the unauthorized disconnection of the dogs 12 from groove 11 so that the cap members may not be removed, the inner lock barrel is turned by the proper key, to rotate the flange 21 to a position where its notches 22 will be out of alignment with the lugs 23, as shown in Fig. 4, and therefore the wheel can not be released from the axle or other support until the lock barrel is rotated by the proper key to bring these notches opposite the lugs 23 on the locking dogs 12, but when so turned, the operator may then, by grasping the handle or tail portions 26 of these dogs, move them radially inward against the action of the spring 25 and against the action of flat springs 27 interposed between these tail portions 26 and the bottoms of the ways 13, thus disengaging said dogs from the groove 11 and permitting said axial cap member 14 with said dogs and key operated lock, to be pulled away from the face of the disk 7, which removal of said member 14 will permit the ready removal of the annular cap 15, leaving the outer end of the hub shell open so that said disk 7 may be released and slipped off, or the nuts 6 may be readily unscrewed to release the hub shell from the inner hub 3.

To hold the dogs 12 and spring 25 in place so that they will not drop out when the cap member 14 is removed, a disk plate 28 is rigidly secured in any suitable manner upon the inner end of said member 14, and to prevent dirt from getting into the ways 13 for said dogs 12, the springs 27 are preferably of a width equal to the width of said ways, and to facilitate the turning of the disk 7 when the hub 9 thereof is screwthreaded to receive the end of the hub 31, the periphery of said disk 7 is formed with notches 29 for the engagement therein of a suitable tool by means of which said disk may be turned, and thus readily removed to permit the removal of the wheel.

By making the hub cap in the form substantially as shown, it may be applied to either the wheels of the rear axle which are driven through the medium of the axle shaft 4, or may be applied to the front wheels which rotate freely upon the pivoted stubs 30 of the front axle, in which latter case the disk 7 is attached to the hub 31 by being screwed thereon.

Obviously the particular form and arrangement of cap and lock may be varied to adapt them to other constructions of wheel hubs, and other changes may be made within the scope of the appended claims without departing from the spirit of the present invention. I do not, therefor, wish to limit myself to the particular construction and arrangement shown.

Having thus fully described my invention what I claim is:

1. The combination with a wheel hub having an open outer end, of a cap for closing said open end of said hub, means projecting through and operable from outside said cap for detachably holding said cap in place over said open end of said hub, and a key operated lock for locking said means against operation to release said cap.

2. The combination with a wheel hub having an open outer end and a member upon which said hub is mounted, of a holding member detachably secured to said member upon which said hub is mounted, a cap to close the open outer end of said hub, means projecting through said cap for detachably engaging said holding member to detachably secure said cap thereto, and key operated locking means for preventing said means projecting through said cap from being operated to release said cap.

3. The combination with a wheel hub having an open outer end and an axial supporting member upon which said hub is mounted, of a disk detachably secured to said supporting member and formed with an inwardly open annular groove, a cap to close the open end of said hub, radially movable means carried by said cap to engage within said groove of said disk and detachably hold said cap in place over the open end of said hub, and a key operated lock to lock said radially movable means against disengagement from said groove.

4. The combination with a wheel hub having an open outer end and an axial supporting member upon which said hub is mounted, of a holding member on said axial supporting member, a cap to close the open end of said hub and formed with radially extending ways, locking members movable in said ways into and out of engagement with said holding member and projecting through said cap to be operated from outside said cap, and yieldable means to normally hold said locking members engaged with said holding member.

5. The combination with an axle and a wheel hub mounted to rotate upon the end of said axle, said hub having an open end projecting beyond the end of said axle, of a disk-shaped holding member detachably connected to said axle and formed with a peripheral inwardly open annular channel, a cap for closing the open end of said hub, said cap being formed with an axial opening and radially extending ways leading from said opening, dogs slidable in said ways and having portions extending outwardly through said cap and portions to engage within said channel of said holding member, yieldable means for holding said dogs engaged in said channel of said holding member, and a key operated lock in said axial opening of said cap to engage and lock said dogs.

6. The combination with a hub shell and an axial shaft-like support in said hub shell, of a disk-like holding member detachably secured to said axial support and formed with an inwardly open annular channel, a central cap member formed with radial ways and openings, a pair of opposed dogs in said ways having end portions to engage in said channel and portions to project through said openings, yieldable means to normally hold said dogs engaged in said channel, an annular cap member having an annular laterally projecting rib to engage within the open end of said hub shell and formed with an axial opening within which said central cap member is adapted to fit, and means for detachably connecting said central and said surrounding annular cap members to prevent relative turning movement of said cap members.

HERBERT WALTERS.